(12) United States Patent
Kato et al.

(10) Patent No.: US 10,988,136 B2
(45) Date of Patent: Apr. 27, 2021

(54) AUTOMATIC PARKING APPARATUS

(71) Applicant: Mitsubishi Electric Corporation, Tokyo (JP)

(72) Inventors: Yoichi Kato, Tokyo (JP); Kenta Onishi, Tokyo (JP); Masahiro Yata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 447 days.

(21) Appl. No.: 15/880,620

(22) Filed: Jan. 26, 2018

(65) Prior Publication Data

US 2019/0071070 A1 Mar. 7, 2019

(30) Foreign Application Priority Data

Sep. 5, 2017 (JP) .............................. JP2017-170364

(51) Int. Cl.
*B60W 30/06* (2006.01)
*B60R 1/00* (2006.01)
(Continued)

(52) U.S. Cl.
CPC .............. *B60W 30/06* (2013.01); *B60R 1/002* (2013.01); *B60W 50/10* (2013.01); *B60W 50/14* (2013.01);
(Continued)

(58) Field of Classification Search
CPC ...... B60R 2300/307; B60R 2300/8026; B60R 11/04; B60R 1/00; B60R 1/002;
(Continued)

(56) References Cited

U.S. PATENT DOCUMENTS 8,374,749 B2 * 2/2013 Tanaka .................. B60W 10/18
701/41
9,598,106 B2 * 3/2017 Sobue ................ B62D 15/0275
(Continued)

FOREIGN PATENT DOCUMENTS

JP          10-269497 A      10/1998
JP          200281942 A       3/2002
(Continued)

OTHER PUBLICATIONS

Communication dated Aug. 14, 2018, from the Japanese Patent Office in counterpart application No. 2017-170364.

*Primary Examiner* — Hunter B Lonsberry
*Assistant Examiner* — Luis A Martinez Borrero
(74) *Attorney, Agent, or Firm* — Sughrue Mion, PLLC; Richard C. Turner

(57) ABSTRACT

The automatic parking apparatus includes: an image generation unit configured to generate an image of surroundings of an own vehicle photographed by a monitor device; a display unit; an input device configured to receive, a first touch input by the user for designating a parking place; a parking area calculation unit configured to determine whether a parking space for the own vehicle is available; a moving path calculation unit configured to determine at least one moving path candidate for guiding the own vehicle from a current location to a parking area, and to display the moving path candidate on the display unit; and a vehicle control processing unit configured to guide and control the own vehicle from the current location to the parking area in accordance with one moving path confirmed by the user operation from among the at least one moving path candidate.

8 Claims, 11 Drawing Sheets

(51) Int. Cl.
*B60W 50/10* (2012.01)
*B60W 50/14* (2020.01)

(52) U.S. Cl.
CPC ... *B60R 2300/207* (2013.01); *B60R 2300/607* (2013.01); *B60R 2300/806* (2013.01); *B60W 2050/146* (2013.01)

(58) Field of Classification Search
CPC ...... B60R 2300/8066; B60R 2300/806; B60R 2300/607; B60W 30/06; B60W 30/09; B60W 30/16; B60W 30/095; B60W 50/10; B60W 50/14; B60W 2554/00; B60W 10/18; B60W 10/20; B60W 2050/146
See application file for complete search history.

(56) References Cited

U.S. PATENT DOCUMENTS

| | | | | |
|---|---|---|---|---|
| 10,198,950 | B2* | 2/2019 | Hayakawa | G08G 1/14 |
| 10,246,131 | B2* | 4/2019 | Terkes | B62D 15/028 |
| 10,268,201 | B2* | 4/2019 | Iwama | B60W 30/06 |
| 10,372,132 | B2* | 8/2019 | Herz | G05D 1/0276 |
| 10,429,850 | B2* | 10/2019 | Kato | G05D 1/0231 |
| 10,438,487 | B2* | 10/2019 | Harai | B60R 21/00 |
| 10,583,829 | B2* | 3/2020 | Kim | B62D 15/0285 |
| 10,737,689 | B2* | 8/2020 | Kim | B60W 10/20 |
| 10,822,030 | B2* | 11/2020 | Lee | G05D 1/0088 |
| 2008/0208680 | A1* | 8/2008 | Cho | G06Q 30/0601 705/13 |
| 2010/0010723 | A1* | 1/2010 | Taki | B60W 30/08 701/102 |
| 2010/0049402 | A1* | 2/2010 | Tanaka | B60R 1/00 701/41 |
| 2012/0101660 | A1* | 4/2012 | Hattori | G05D 1/0022 701/2 |
| 2014/0114529 | A1* | 4/2014 | An | B60R 1/00 701/36 |
| 2014/0163862 | A1* | 6/2014 | Choi | B60W 30/06 701/400 |
| 2014/0172220 | A1* | 6/2014 | You | B60W 30/12 701/23 |
| 2014/0197939 | A1* | 7/2014 | Stefan | G08G 1/168 340/435 |
| 2014/0244095 | A1* | 8/2014 | Choi | B62D 15/0285 701/25 |
| 2014/0266803 | A1* | 9/2014 | Bulan | G06K 9/00785 340/932.2 |
| 2015/0151789 | A1* | 6/2015 | Lee | G08G 1/165 701/41 |
| 2015/0353080 | A1* | 12/2015 | Mukaiyama | E05B 77/54 701/23 |
| 2017/0036695 | A1* | 2/2017 | Lee | B62D 15/027 |
| 2017/0096167 | A1* | 4/2017 | Yoon | B62D 15/028 |
| 2018/0093663 | A1* | 4/2018 | Kim | G08G 1/168 |
| 2018/0129218 | A1* | 5/2018 | Kato | G05D 1/0231 |
| 2018/0164817 | A1* | 6/2018 | Herz | G05D 1/0212 |
| 2018/0237069 | A1* | 8/2018 | Gehin | G05D 1/0212 |
| 2018/0246515 | A1* | 8/2018 | Iwama | G05D 1/0246 |
| 2018/0345955 | A1* | 12/2018 | Kim | B62D 15/028 |
| 2019/0054927 | A1* | 2/2019 | Hayakawa | B62D 15/027 |
| 2019/0176888 | A1* | 6/2019 | Lee | G05D 1/0088 |
| 2020/0062242 | A1* | 2/2020 | Hayakawa | B62D 15/0285 |

FOREIGN PATENT DOCUMENTS

| | | |
|---|---|---|
| JP | 2005239048 A | 9/2005 |
| JP | 2008298740 A | 12/2008 |
| JP | 201253543 A | 3/2012 |
| JP | 2013241088 A | 12/2013 |
| WO | 2011045861 A1 | 4/2011 |

* cited by examiner

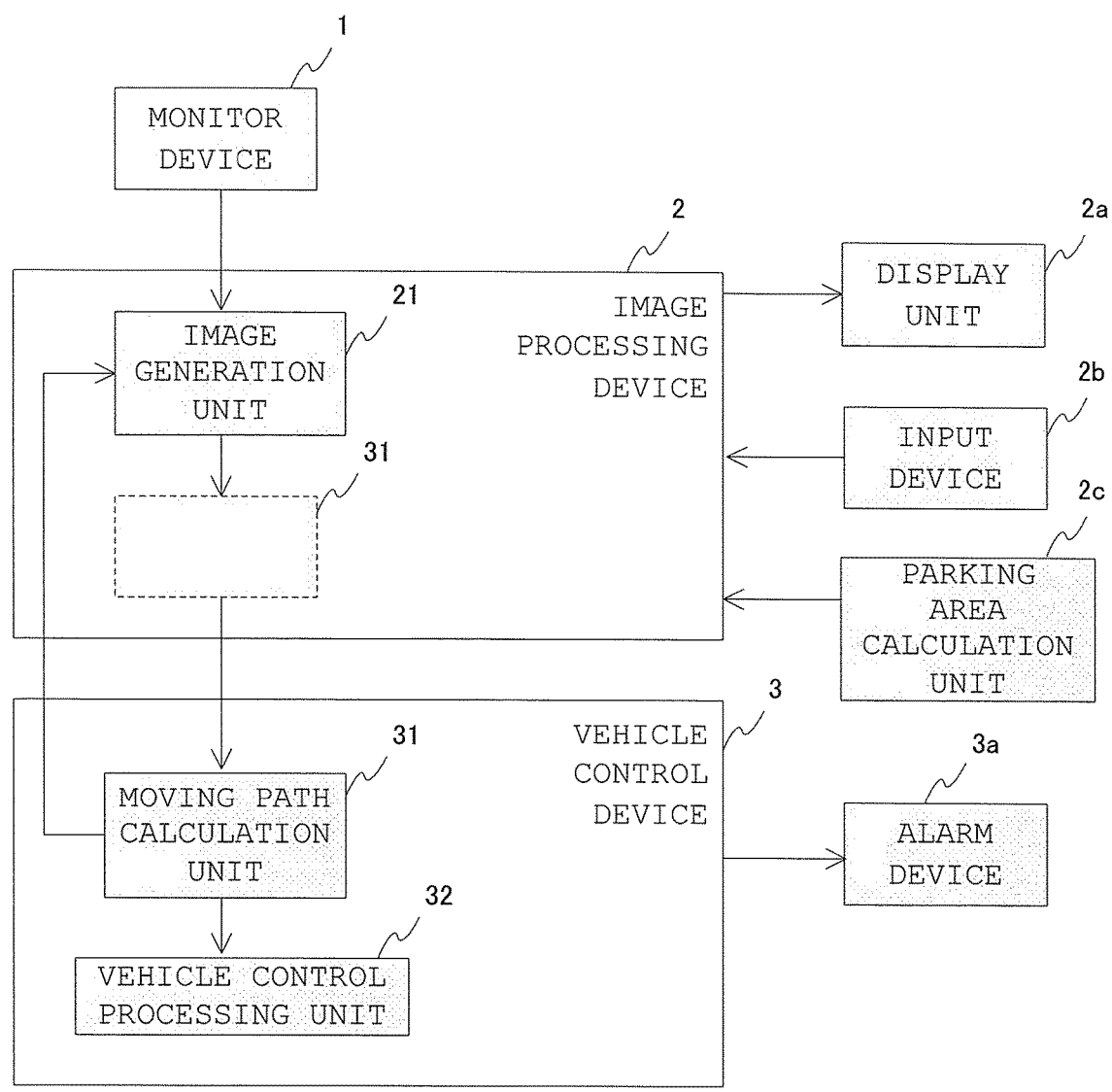
[FIG. 1]

[FIG. 2]
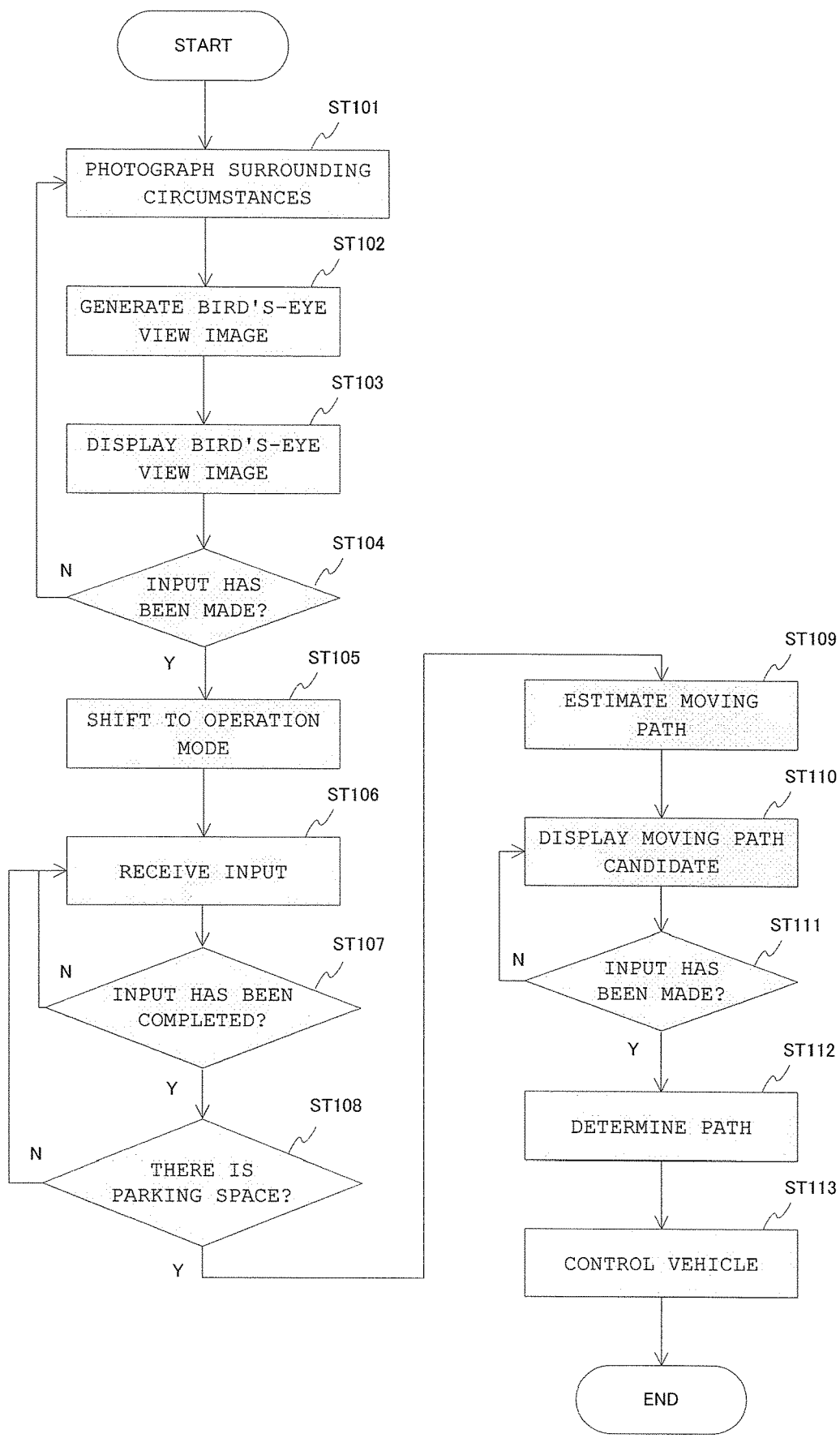

[FIG. 3]
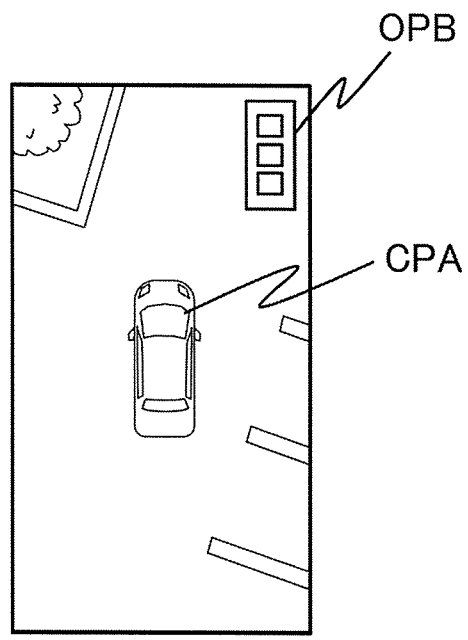
[FIG. 4A]
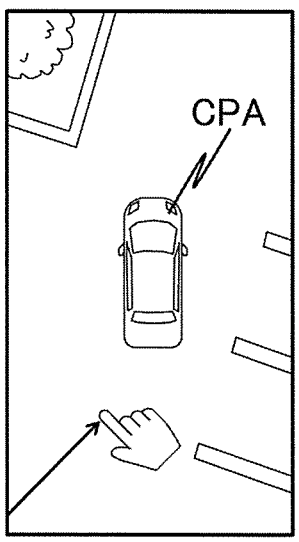
[FIG. 4B]
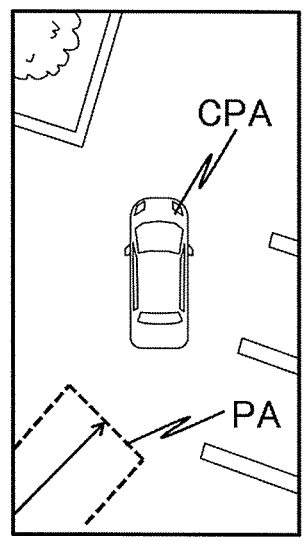
[FIG. 4C]
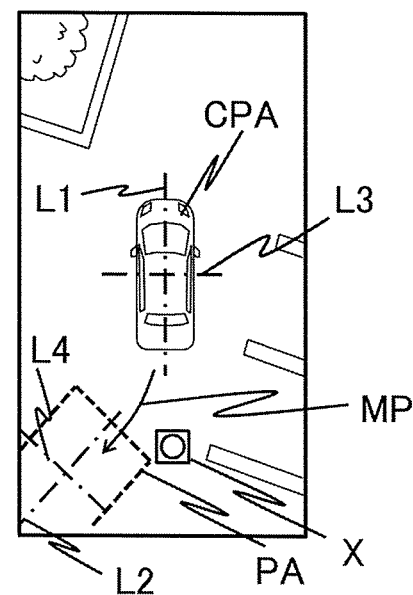

[FIG. 5]
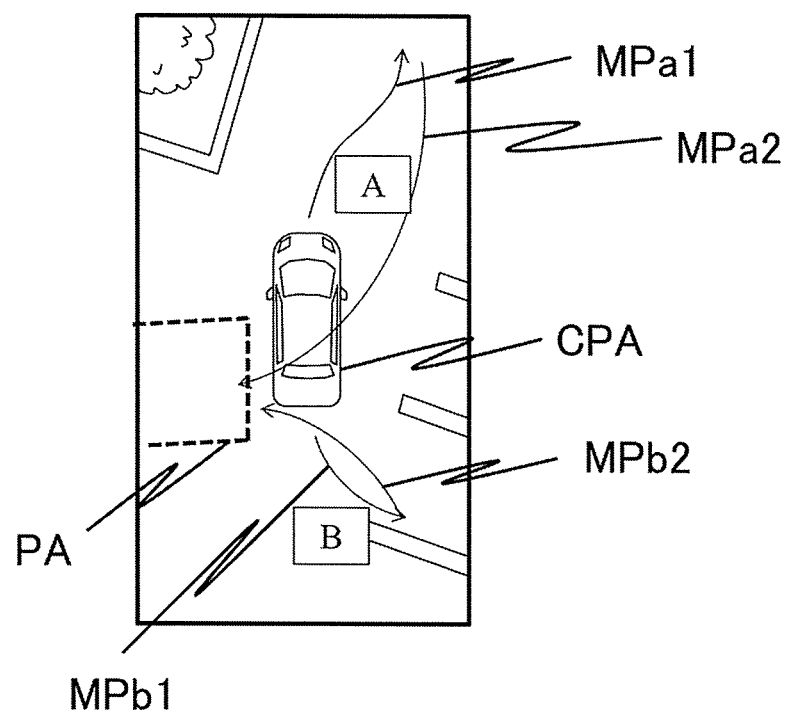

[FIG. 6]
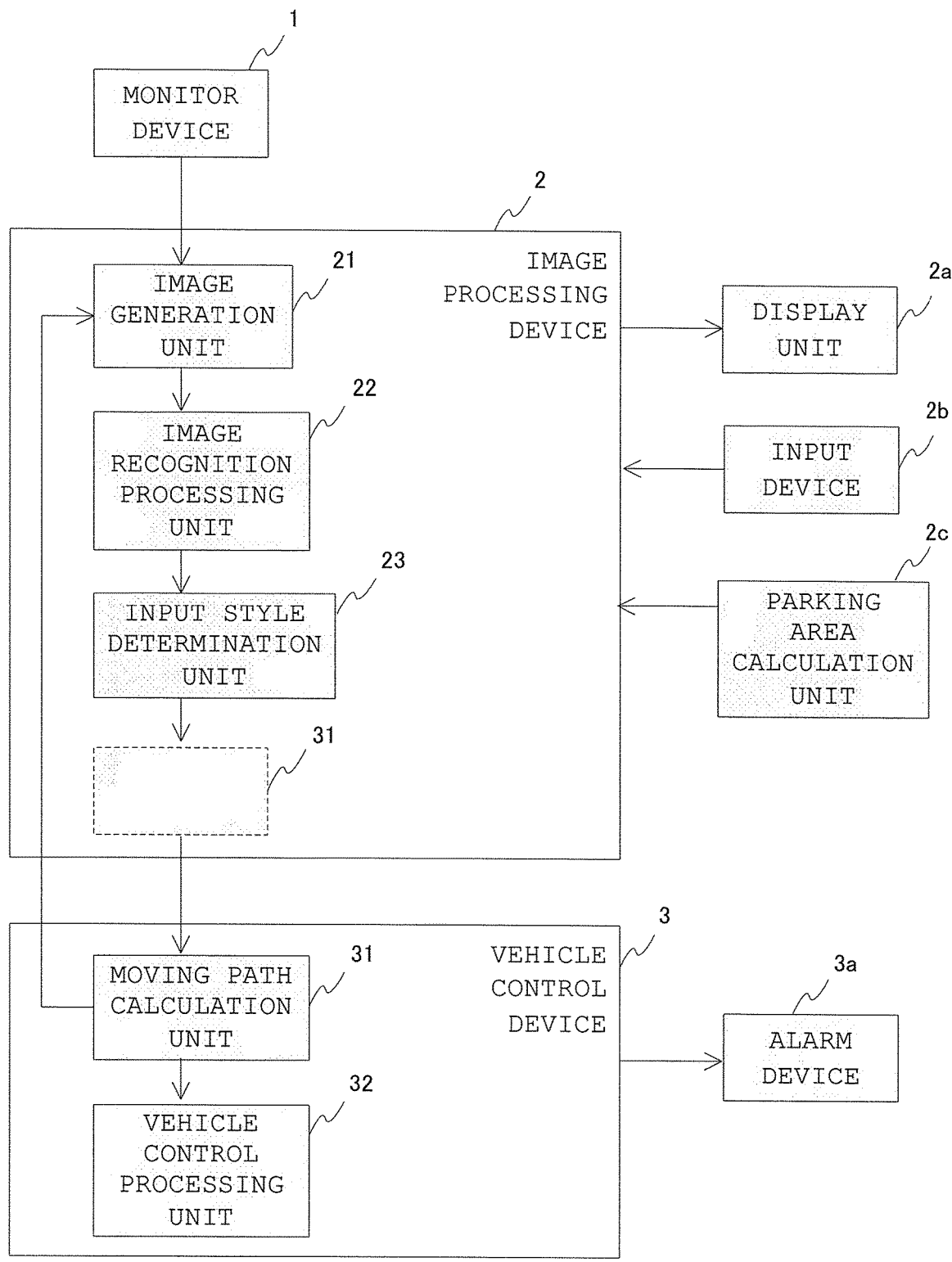

[FIG. 7]
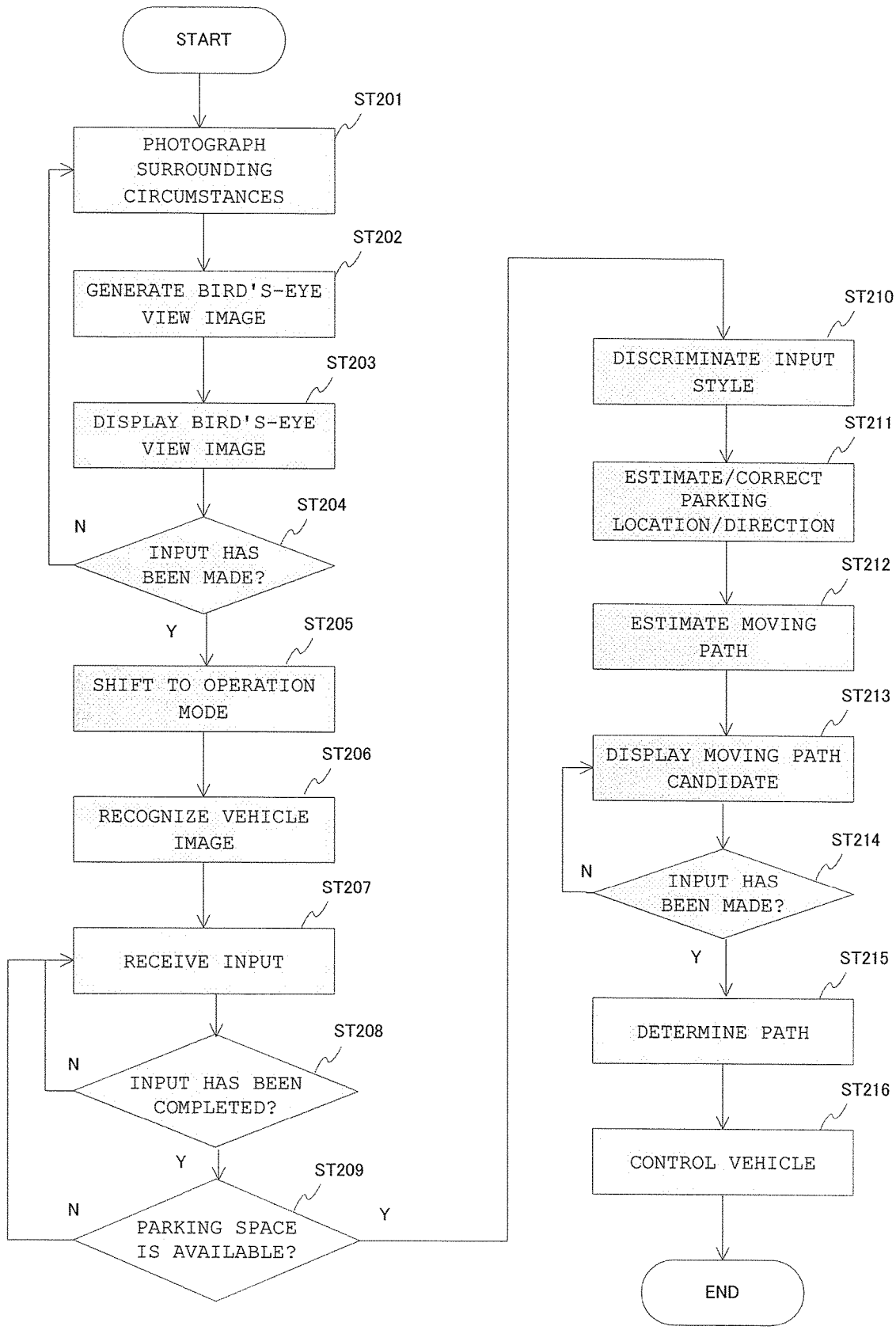

[FIG. 8A]
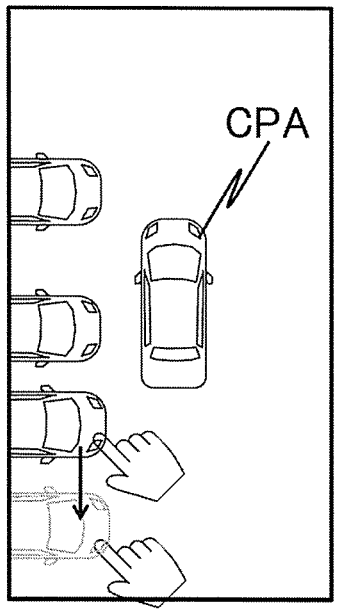
[FIG. 8B]
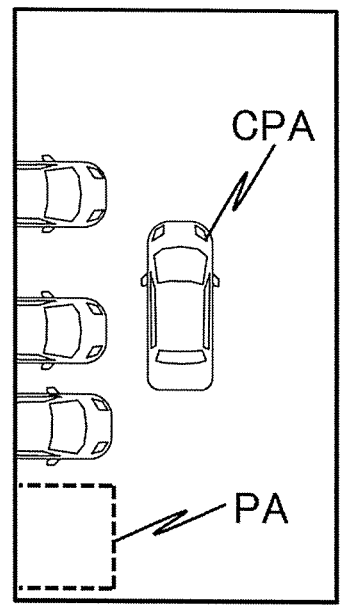
[FIG. 9A]
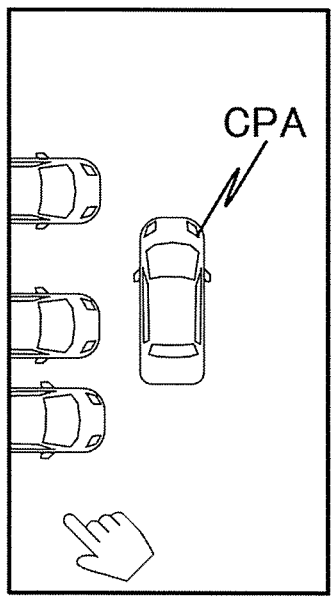
[FIG. 9B]
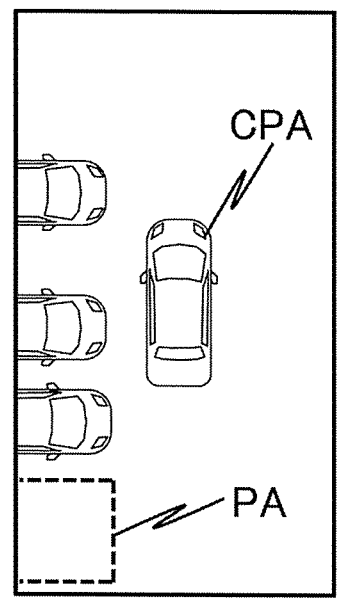

[FIG. 10]
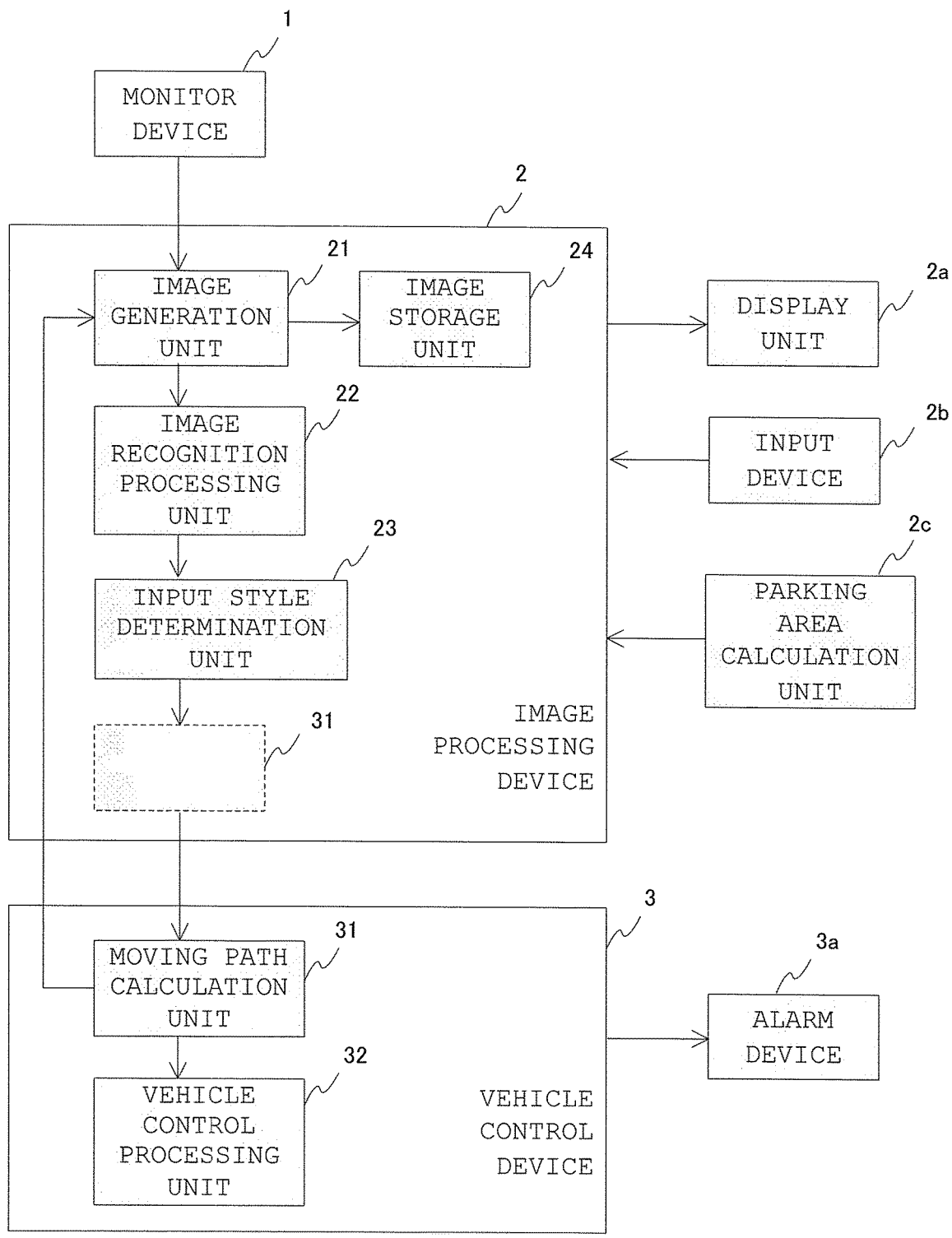

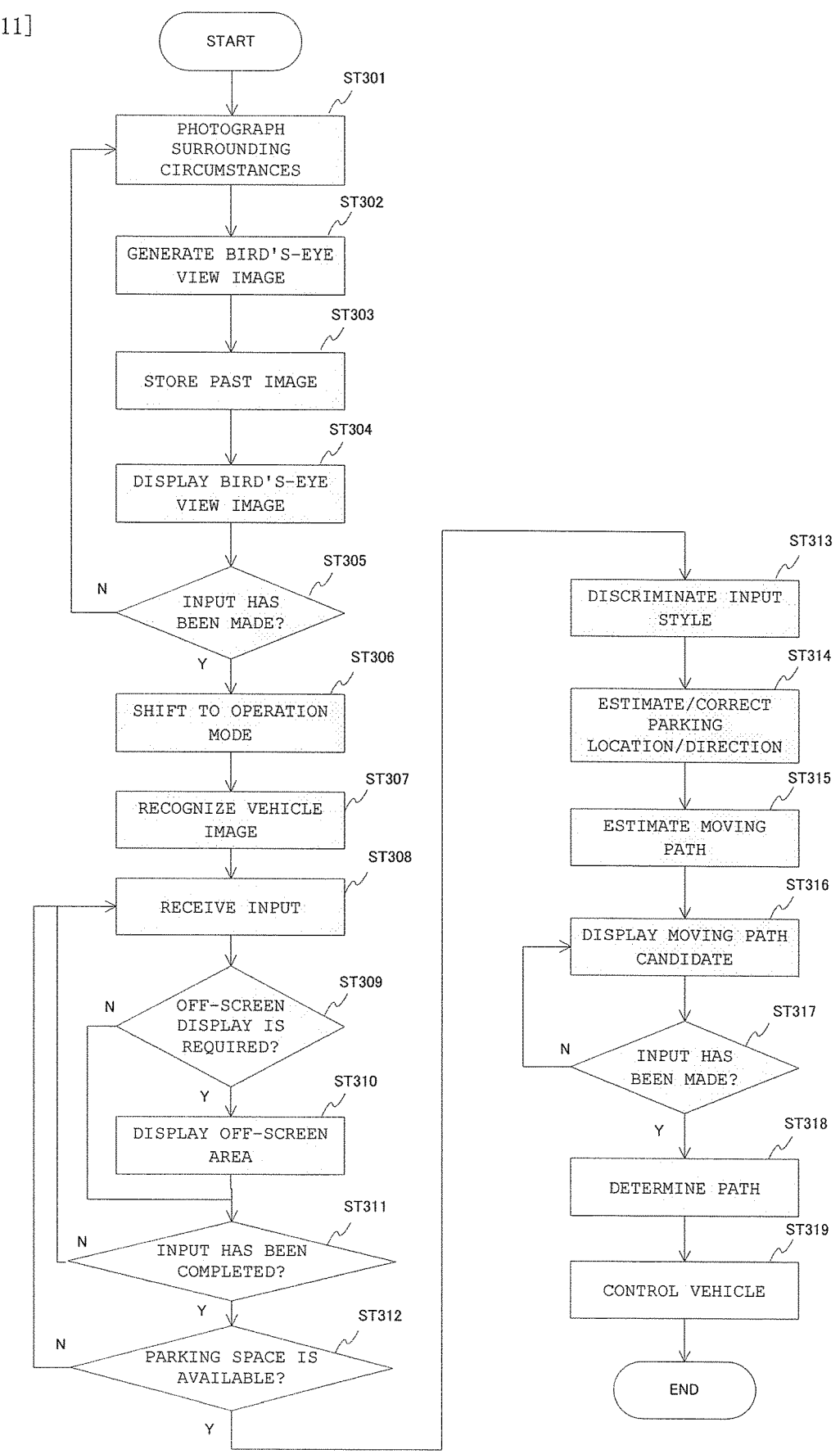

[FIG. 12A]
OFF-SCREEN DISPLAY MODE BUTTON
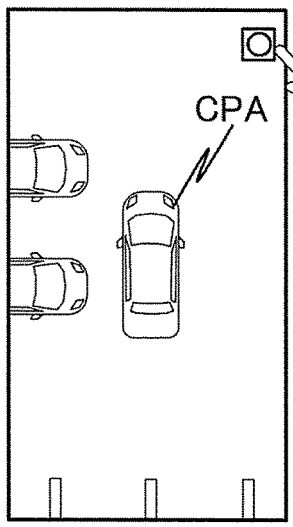
[FIG. 12B]
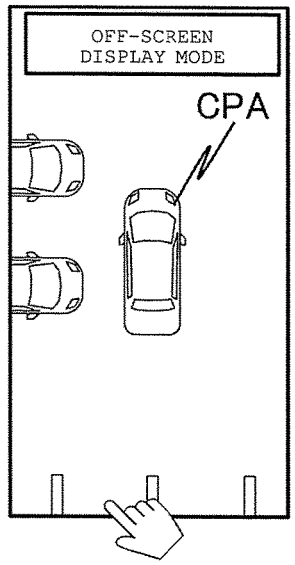
TOUCH OPERATION
[FIG. 12C]
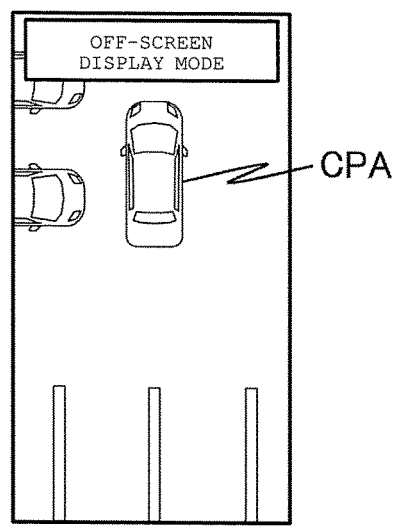
[FIG. 13A]
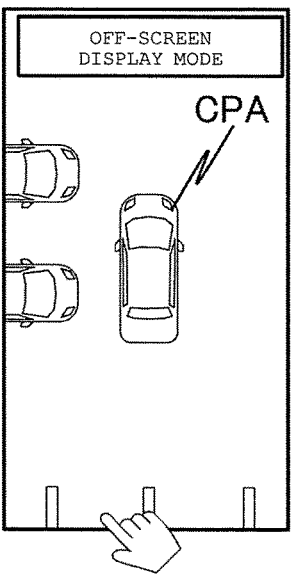
SLIDE AFTER TOUCHING FOR FIXED PERIOD OF TIME
[FIG. 13B]
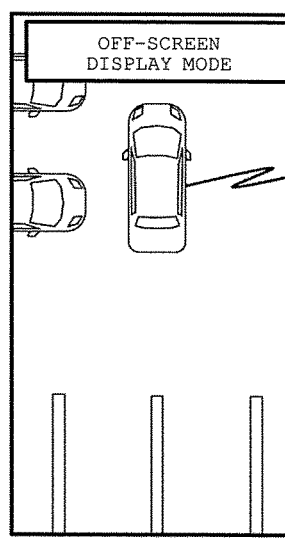

[FIG. 14A] [FIG. 14B]
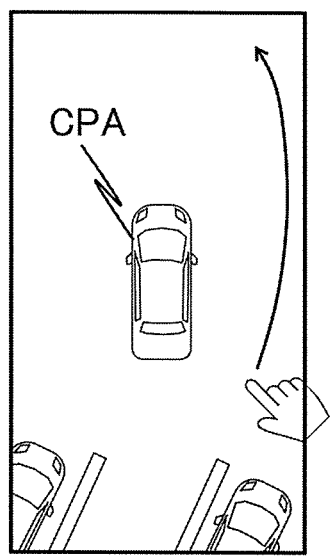
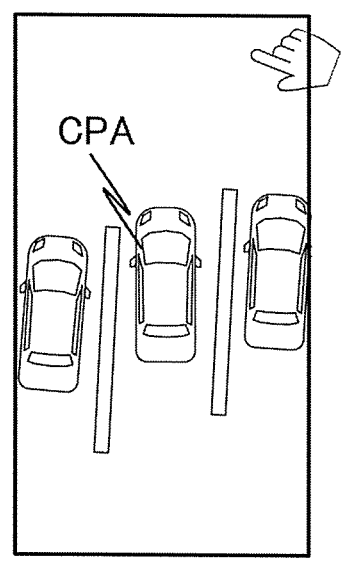

AUTOMATIC PARKING APPARATUS

BACKGROUND OF THE INVENTION

1. Field of the Invention

The present invention relates to an automatic parking apparatus configured to cause a vehicle to automatically move to a set parking space in a simple manner.

2. Description of the Related Art

As the related art, there has been an apparatus configured to recognize an entrance of a parking section designated by an entrance designation indication, for example, a marker. Further, the related-art apparatus calculates a traveling track of the own vehicle to be required until the vehicle reaches a parking space, that is, a parking area, after passing through the entrance. Such a related-art apparatus enables the own vehicle to be automatically moved to the parking area along the traveling track by controlling a travel driving force, a braking force, steering, and an automatic transmission of the own vehicle.

A marker recognition device included in the related-art apparatus recognizes the marker provided in the parking lot and formed of, for example, a white line within the parking lot. The related-art apparatus causes the vehicle to automatically move to a predetermined parking area through the recognition result obtained by the marker recognition device. For example, there has been known the related art in which the marker provided in the parking lot is used to set a target parking section, and the vehicle is moved or guided to the target parking section (see, for example, Japanese Patent Application Laid-open No. Hei 10-269497).

However, the related art has the following problems.

The automatic parking apparatus of Japanese Patent Application Laid-open No. Hei 10-269497 cannot be used in a parking lot in which the marker, for example, the white line, is not provided to the parking space. That is, the automatic parking apparatus of Japanese Patent Application Laid-open No. Hei 10-269497 cannot move or guide a vehicle to the parking area in which a user wishes to park the vehicle irrespective of whether or not the marker is provided to the parking lot. Further, the automatic parking apparatus of Japanese Patent Application Laid-open No. Hei 10-269497 does not allow the user to recognize or set the parking area in a simple manner.

SUMMARY OF THE INVENTION

The present invention has been made in order to solve the problems described above, and has an object to provide an automatic parking apparatus capable of allowing a user to easily recognize and set a parking area in which the user wishes to park a vehicle, and of moving or guiding the vehicle to the set parking space in a simple manner, regardless of whether or not a white line or other such mark is provided to the parking space.

According to one embodiment of the present invention, there is provided an automatic parking apparatus including: a monitor device configured to photograph surroundings of an own vehicle; an image generation unit configured to generate an image of the surroundings of the own vehicle photographed by the monitor device; a display unit configured to display the image generated by the image generation unit; an input device configured to receive, on a screen displayed on the display unit, a first touch input by a user for designating a parking place; a parking area calculation unit configured to specify a parking area to which the own vehicle is to be moved based on the first touch input, and to determine whether a parking space for the own vehicle is available in the parking area; a moving path calculation unit configured to determine at least one moving path candidate for guiding the own vehicle from a current location to a parking area determined by the parking area calculation unit as having the parking space, and to display the at least one moving path candidate on the display unit; and a vehicle control processing unit configured to receive a user operation for confirming one moving path from among the at least one moving path candidate, and to guide and control the own vehicle from the current location to the parking area in accordance with the one moving path confirmed by the user operation.

According to the present invention, the automatic parking apparatus includes the feature of generating and displaying the image of surroundings of the own vehicle by the image generation unit based on the image photographed by the monitor device, and the feature of guiding and controlling the own vehicle to the parking area designated in accordance with the input operation by the user. As a result, it is possible to provide the automatic parking apparatus capable of allowing the user to easily recognize and set the parking area in which the user wishes to park the vehicle, and of moving or guiding the vehicle to the set parking space in a simple manner, regardless of whether or not a white line or other such mark is provided to the parking space.

BRIEF DESCRIPTION OF THE DRAWINGS

FIG. 1 is a block diagram for illustrating a configuration of an automatic parking apparatus according to a first embodiment of the present invention.

FIG. 2 is a flowchart for illustrating an example of a series of operations of the automatic parking apparatus according to the first embodiment of the present invention.

FIG. 3 is a diagram for illustrating an example of a bird's-eye view image to be displayed on a display unit in the first embodiment of the present invention.

FIG. 4A is a diagram for illustrating an example of an operation of setting a target parking area by a user in the first embodiment of the present invention.

FIG. 4B is a diagram for illustrating an example of an operation of setting a target parking area by a user in the first embodiment of the present invention.

FIG. 4C is a diagram for illustrating an example of an operation of setting a target parking area by a user in the first embodiment of the present invention.

FIG. 5 is a diagram for illustrating an operation performed when a moving path to the target parking area requires turning back of a vehicle, and there are a plurality of paths requiring turning back of a vehicle, in the first embodiment of the present invention.

FIG. 6 is a block diagram for illustrating a configuration of an automatic parking apparatus according to a second embodiment of the present invention.

FIG. 7 is a flowchart for illustrating an example of a series of operations of the automatic parking apparatus according to the second embodiment of the present invention.

FIG. 8A is a diagram for illustrating an example of an operation of setting the target parking area by the user in the second embodiment of the present invention.

FIG. 8B is a diagram for illustrating an example of an operation of setting the target parking area by the user in the second embodiment of the present invention.

FIG. 9A is a diagram for illustrating another example of the operation of setting the target parking area by the user in the second embodiment of the present invention.

FIG. 9B is a diagram for illustrating another example of the operation of setting the target parking area by the user in the second embodiment of the present invention.

FIG. 10 is a block diagram for illustrating a configuration of an automatic parking apparatus according to a third embodiment of the present invention.

FIG. 11 is a flowchart for illustrating an example of a series of operations of the automatic parking apparatus according to the third embodiment of the present invention.

FIG. 12A is a diagram for illustrating an example of an operation for displaying an off-screen target parking area in the third embodiment of the present invention.

FIG. 12B is a diagram for illustrating an example of an operation for displaying an off-screen target parking area in the third embodiment of the present invention.

FIG. 12C is a diagram for illustrating an example of an operation for displaying an off-screen target parking area in the third embodiment of the present invention.

FIG. 13A is a diagram for illustrating an example of another operation for displaying the off-screen target parking area in the third embodiment of the present invention.

FIG. 13B is a diagram for illustrating an example of another operation for displaying the off-screen target parking area in the third embodiment of the present invention.

FIG. 14A is a diagram for illustrating an example of an operation of setting the off-screen target parking area in the third embodiment of the present invention.

FIG. 14B is a diagram for illustrating an example of an operation of setting the off-screen target parking area in the third embodiment of the present invention.

DESCRIPTION OF THE EMBODIMENTS

Now, an automatic parking apparatus according to embodiments of the present invention are described referring to the accompanying drawings. In the respective embodiments, the same components or corresponding components are denoted by the same reference symbols, and the overlapping description thereof is herein omitted.

First Embodiment

In a first embodiment of the present invention, a description is made of the automatic parking apparatus configured to display an image, which is obtained through photographing by a monitor device configured to photograph surroundings of an own vehicle, on a display unit inside the own vehicle, and move the own vehicle to a target parking area designated within the image by a user.

FIG. 1 is a block diagram for illustrating a configuration of the automatic parking apparatus according to the first embodiment of the present invention. A monitor device 1 is mounted to a vehicle, and photographs the surroundings of the own vehicle. An image processing device 2 displays an image obtained through the photographing by the monitor device 1, and receives an input operation from the user. A vehicle control device 3 controls the own vehicle based on the input operation received from the user.

The image processing device 2 includes an image generation unit 21, a display unit 2a, an input device 2b, and a parking area calculation unit 2c. The image generation unit 21 receives a video signal obtained by the monitor device 1, and converts the obtained video signal into a bird's-eye view image. The image generation unit 21 also causes the display unit 2a to display the generated bird's-eye view image.

The input device 2b receives an operation of inputting, for example, the target parking area from the user based on the bird's-eye view image displayed on the display unit 2a. The parking area calculation unit 2c determines whether or not there are sufficient parking spaces in the target parking area input by the user.

The vehicle control apparatus 3 includes a moving path calculation unit 31, a vehicle control processing unit 32, and an alarm device 3a. The moving path calculation unit 31 calculates, in accordance with the operation of inputting the target parking area from the user, a moving path of the vehicle based on a relationship between the current own vehicle location area, namely, the own vehicle location area at the start time of the parking operation, and the target parking area.

The vehicle control processing unit 32 controls driving of the vehicle in accordance with the moving path calculated by the moving path calculation unit 31. The moving path calculation unit 31 and the vehicle control processing unit 32 can issue a suitable announcement relating to a calculation result and a processing result to the user via the alarm device 3a.

In this case, it is assumed that the target parking area and the own vehicle location area at the start time of the parking operation each have an area and a shape corresponding to the shape of a target vehicle. Further, in FIG. 1, the arrows each indicate how a signal flows.

FIG. 2 is a flowchart for illustrating an example of a series of operations of the automatic parking apparatus according to the first embodiment of the present invention. Operations of the respective components illustrated in FIG. 1 are now described with reference to the flowchart of FIG. 2.

First, the monitor device 1 mounted to the own vehicle photographs a surrounding environment of the own vehicle (Step ST101). The purpose of the monitor device 1 is to photograph the surroundings of the vehicle in order to present the surrounding environment of the own vehicle as a bird's-eye view image to be subsequently generated by the image processing device 2. Therefore, not only one camera but also a plurality of cameras may be mounted to the monitor device 1.

The image data obtained through the photographing is input to the image generation unit 21 to generate the bird's-eye view image (Step ST102). Examples of a method of generating the bird's-eye view image include a method of deforming the respective images obtained through the photographing by cameras, which are mounted at four spots on the front, rear, left, and right sides of the vehicle, based on a transformation corresponding to mounted positions of the cameras, and further joining the images, to thereby generate the birds-eye view image.

Such a monitor device 1, which photographs the respective images, is known as a multi-angle surround-view monitor. Based on the respective images photographed by the multi-angle surround-view monitor, the image generation unit 21 can generate, for example, a bird's-eye view image of all around the vehicle in which the own vehicle location area is at the center of the image.

The generated bird's-eye view image is displayed on the display screen 2a so as to be able to be confirmed by the user (Step ST103). In this manner, the image obtained through the photographing by the monitor device 1 is constantly updated in real time, and is displayed as a birds-eye view image.

FIG. 3 is a diagram for illustrating an example of a bird's-eye view image displayed on the display unit 2a in the first embodiment of the present invention. In FIG. 3, there is illustrated an example in which an image for showing an own vehicle location area CPA at the start time of the parking operation is arranged at the center of the screen, and a view of the surroundings is displayed as a bird's-eye view image.

Next, the user, who wishes to automatically park the vehicle in a desired area on the display unit 2a, performs an input operation on the image processing device 2 by using the input device 2b (Step ST104). The input device 2b may be, for example, a transparent touch panel formed on the display unit 2a or an operation button existing separately from the display unit 2a. As the input method performed when the input device 2b is a transparent touch panel formed on the display unit 2a, the touch operation may be performed on a button OPB displayed on the touch panel, as illustrated in the example of FIG. 3.

When the input is started, the image generation unit 21 shifts to a user operation mode (Step ST105), and prompts the user to designate the target parking area through, for example, dedicated display on the display unit 2a.

After that, the image generation unit 21 continues to receive an operation for designating the target parking area from the user until an input completion operation is performed (Step ST106).

FIG. 4A to FIG. 4C are diagrams for illustrating an example of the operation of setting the target parking area by the user in the first embodiment of the present invention. As illustrated in FIG. 4A, an example of the operation of inputting the target parking area is a method in which the user draws on the displayed image an arrow indicating a parking location and direction based on a touch operation on the touch panel of the display unit 2a. In this method, the user can designate the parking location such that the axis of the drawn arrow matches the center axis of the vehicle and the front end of the vehicle matches the tip of the arrow.

Next, the image generation unit 21 determines whether or not input is complete (Step ST107). Specifically, the image generation unit 21 determines whether or not an input completion operation has been performed by the user. It is assumed that the input completion operation is performed in this case when, for example, the user's finger is lifted off the touch panel during the operation of inputting the target parking area. In another case, it may also be assumed that the input completion operation is the touching operation of a completion button OPB displayed on the touch panel by the user when input is complete.

As illustrated in FIG. 4B, when a parking area PA is designated by an input completion operation by the user, the parking area calculation unit 2c determines whether or not there are sufficient parking spaces in the parking area PA (Step ST108). When it is determined that there are not sufficient parking spaces in the parking area PA, the parking area calculation unit 2c prompts the user to re-input a target parking area. The detection of the parking area by the parking area calculation unit 2c may be performed by using a laser radar or other such sensor capable of detecting three-dimensional objects, for example.

When it is determined that the vehicle can be parked, coordinate information on the own vehicle location area CPA on the screen and coordinate information on the designated parking area PA on the screen are input from the image generation unit 21 to the moving path calculation unit 31 of the vehicle control device 3. The moving path calculation unit 31 then estimates the moving path for guiding the own vehicle present in the own vehicle location area CPA to the parking area PA based on those pieces of coordinate information (Step ST109).

In the processing for estimating the moving path, the moving path calculation unit 31 refers to a vehicle size of the own vehicle, a turnable radius thereof, and the like in addition to a positional relationship between the coordinate information on the own vehicle location area CPA and the coordinate information on the designated parking area PA on the screen.

In FIG. 4C, there is illustrated a state in which a moving path MP estimated by the moving path calculation unit 31 is displayed.

As described above, the moving path calculation unit 31 estimates the moving path MP by using the coordinate information on the own vehicle location area CPA on the screen, the coordinate information on the designated parking area PA on the screen, the longitudinal and lateral lengths of the own vehicle, namely, the vehicle size defined by the length and the width, the turnable radius thereof, a preset speed pattern of the vehicle at the time of the parking operation, and other such information.

Specifically, the moving path calculation unit 31 estimates the moving path MP by moving the vehicle so that a center line L1 of the vehicle within the own vehicle location area CPA matches a center line L2 of the parking area PA along the parking direction of the vehicle.

In this case, the moving path calculation unit 31 estimates the moving path MP in consideration of a range that allows the own vehicle to move based on the information on the vehicle size, the turnable radius, and the like of the own vehicle. The moving path calculation unit 31 performs the estimation so that, in terms of the location of the vehicle within the parking area PA in the front-and-rear direction, a center line L3 of the vehicle along the lateral direction matches a center line L4 of the vehicle within the parking area PA along a direction perpendicular to the parking direction of the vehicle.

In the example described above, center lines are employed as reference lines for estimating the moving path MP. However, for example, in place of a center line, a line along any one of the left and right ends of the vehicle or along any one of the front and rear ends of the vehicle within the own vehicle location area CPA or the parking area PA may be employed as the reference line.

When estimating the moving path MP, the moving path calculation unit 31 determines whether or not turning back of the vehicle is required based on a positional relationship between the own vehicle location area CPA at the start time of the operation and the parking area PA. In FIG. 4C, there is illustrated an example in which turning back of the vehicle is not required, and the vehicle can be parked by only moving backward from the beginning.

On the other hand, FIG. 5 is a diagram for illustrating an operation performed when a moving path to the target parking area requires turning back of the vehicle and there are a plurality of paths requiring turning back of the vehicle in the first embodiment of the present invention. A path A illustrated in FIG. 5 is a combination of a moving path MPa1 in which the vehicle is first moved forward and a moving path MPa2 in which the vehicle is then moved backward. Meanwhile, a path B illustrated in FIG. 5 is a combination of a moving path MPb1 in which the vehicle is first moved backward and a moving path MPb2 in which the vehicle is then moved forward.

The moving path calculation unit 31 determines whether or not turning back of the vehicle is required, and then estimates the moving path MP by gradually causing each of the reference line of the own vehicle location area CPA and the reference line of the parking area PA to match each other in accordance with the speed pattern of the vehicle at the time of the parking operation.

The moving path MP estimated in this manner is transmitted from the moving path calculation unit 31 to the image generation unit 21. The image generation unit 21 then displays the estimated moving path MP on the display unit 2a for the user (Step ST110).

The moving path calculation unit 31 included in the vehicle control apparatus 3 uses the bird's-eye view image to calculate the moving path, and hence the moving path calculation unit 31 may be included in the image processing device 2. The same applies to the configurations of FIG. 6 and FIG. 10 described later.

The user designates a desired path from the displayed paths through the input device 2b (Step ST111). As illustrated in FIG. 4C, when turning back of the vehicle is not required, and the vehicle can be parked by only moving backward from the beginning, the user presses a selection button X displayed on the touch panel. On the other hand, as illustrated in FIG. 5, when a plurality of moving paths MP are displayed, the user selects a selection button A or B displayed on the touch panel.

When the moving path MP is selected by the user in this manner, the selection signal is input to the moving path calculation unit 31, and the moving path MP is determined (Step ST112). The determined moving path MP is input to the vehicle control processing unit 32. Then, the vehicle control processing unit 32 executes control for guiding the own vehicle from the own vehicle location area CPA to the parking area PA in accordance with the moving path MP (Step ST113).

In this way, the automatic parking apparatus according to the first embodiment includes the following features.

Feature of enabling the user to easily designate the parking area in which the user wishes to park.

Feature of estimating one or more optimum moving paths from a current own vehicle location to a designated parking area, and displaying the estimated moving path(s) on a bird's-eye view image.

Feature of enabling the user to select the desired moving path from among the one or more displayed moving paths.

Feature of automatically guiding and controlling the own vehicle from the own vehicle location area to the parking area based on a selection result by the user.

Through the inclusion of such features, regardless of whether or not a white line or other such mark is provided to the parking space, the user can easily recognize and set the parking area in which the user wishes to park, and the vehicle can be easily and automatically guided and controlled to the desired parking area.

Second Embodiment

FIG. 6 is a block diagram for illustrating a configuration of an automatic parking apparatus according to a second embodiment of the present invention. The configuration illustrated in FIG. 6 of the second embodiment differs from the configuration of FIG. 1 of the first embodiment in terms of further including an image recognition processing unit 22 and an input style determination unit 23, but the other parts are the same as in the first embodiment. Those differences are now described in detail.

The image recognition processing unit 22 recognizes objects, for example, a vehicle and a parking frame, present on the display unit 2a. When the automatic parking apparatus has a plurality of input methods to be performed during designation of the desired parking location by the user, the input style determination unit 23 automatically discriminates an input style based on the information on the operation by the user.

As a result of the added features described above, a more intuitive input method can be achieved that is different from the parking location input method described in the first embodiment, and the parking location designated by the user can be finely adjusted automatically in accordance with the surrounding environment. The specific processing of the automatic parking apparatus according to the second embodiment is described in detail with reference to FIG. 7 to FIG. 9A and FIG. 9B.

FIG. 7 is a flowchart for illustrating an example of a series of operations of the automatic parking apparatus according to the second embodiment of the present invention. Now, operations of the respective components illustrated in FIG. 6 are described with reference to the flowchart of FIG. 7.

The processing from Step ST201 to Step ST205 is the same as the processing from Step ST101 to Step ST105 of the first embodiment.

After the shift to the user operation mode in Step ST205, the image recognition processing unit 22 performs processing of recognizing a parked vehicle different from the own vehicle and a parking frame that are present in the bird's-eye view image generated by the image generation unit 21. The image recognition processing unit 22 then stores in a storage unit location information indicating the location on the image in which the vehicle and the parking frame are present (Step ST206). The stored location information is used when input is performed in accordance with the input style of FIG. 8A and FIG. 8B, which is described later, and when processing of estimating/correcting the location and direction of the own vehicle after designation of the parking location (Step ST211) is performed.

The processing from Step ST207 to Step ST209 is the same as the processing from Step ST106 to Step ST108 of the first embodiment. However, in the second embodiment, in addition to the input style illustrated in FIG. 4A, namely, drawing an arrow, for example, cases in which a plurality of input styles exist can be taken into consideration.

FIG. 8A and FIG. 8B are diagrams for illustrating an example of the operation of setting the target parking area by the user in the second embodiment of the present invention. The first of the plurality of input styles to be described in the second embodiment is, for example, as illustrated in FIG. 8A, a so-called dragging style in which a parked vehicle that is already present on the bird's-eye view image is touched and slid.

In this dragging style, there is a benefit in that the user can more intuitively designate a parking area PA like that illustrated in FIG. 8B when the user wishes to park the own vehicle in parallel to a parked vehicle that is already present.

FIG. 9A and FIG. 9B are diagrams for illustrating another example of the operation of setting the target parking area by the user in the second embodiment of the present invention. The second of the plurality of input styles to be described in the second embodiment is, for example, as illustrated in FIG. 9A, a style in which the parking location is designated by only touching one point on the touch panel.

In this style, the sliding operation by the user for designating the direction is omitted, and the parking direction is estimated from the surrounding environment by performing processing of automatically estimating the parking direction as described below (Step ST211). In this style, there is a benefit in that a parking area PA like that illustrated in FIG. 9B can be designated while placing a less burden on the user during input as compared with the above-mentioned dragging style.

After input is complete of the parking location by the user using a style like that illustrated in FIG. 4A to FIG. 4C, FIG. 8A and FIG. 8B, or FIG. 9A and FIG. 9B, based on the input operation information, the input style determination unit 23 discriminates which of the styles illustrated in FIG. 4A to FIG. 4C, FIG. 8A and FIG. 8B, and FIG. 9A and FIG. 9B has been employed for the input operation (Step ST210).

For example, the input style determination unit 23 can determine whether the style illustrated in FIG. 4A to FIG. 4C or whether the style illustrated in FIG. 9A and FIG. 9B has been employed by discriminating, based on the lengths of the start point and the end point, whether the user touched only one point or performed a sliding operation after the touch operation. When the user has performed a sliding operation, and the parked vehicle recognized in Step ST206 is present at the start point of that sliding operation, the input style determination unit 23 can determine that the employed style is the style illustrated in FIG. 8A and FIG. 8B.

After discrimination of the input style, the parking area PA is designated. In this processing, before estimating the moving path, the moving path calculation unit 31 estimates and corrects the parking location and direction (Step ST211). More specifically, when the input style is a one-touch operation like that illustrated in FIG. 9A and FIG. 9B, the moving path calculation unit 31 estimates and corrects the parking location and direction of the own vehicle based on the location and direction of the adjacent parked vehicle or parking frame recognized in advance in Step ST206.

For example, the moving path calculation unit 31 can perform this estimation and correction by matching the direction of the adjacent parked vehicle and then aligning the front-end position of the own vehicle. When the location designated by the user is inside a parking frame, the moving path calculation unit 31 can correct the location so that the designated location fits within the parking frame, and can estimate the direction based on another parked vehicle.

The processing of Step ST212 and the subsequent steps is the same as the processing of Step ST109 and the subsequent steps of the first embodiment, and hence a description thereof is omitted here.

In this way, the automatic parking apparatus according to the second embodiment includes the following feature in addition to the features of the first embodiment.

Feature of enabling the parking area in which the user wishes to park to be easily designated by a dragging style on the touch panel or a style of touching one point on the touch panel.

Through the further inclusion of such a feature, regardless of whether or not a white line or other such mark is provided to the parking space, the user can more intuitively and easily recognize and set the parking area in which the user wishes to park, and the vehicle can be easily and automatically guided and controlled to the desired parking area.

Third Embodiment

FIG. 10 is a block diagram for illustrating a configuration of an automatic parking apparatus according to a third embodiment of the present invention. The configuration illustrated in FIG. 10 of the third embodiment differs from the configuration of FIG. 6 of the second embodiment in terms of further including an image storage unit 24, but the other parts are the same as in the first embodiment. Those differences are now described in detail.

The image storage unit 24 temporarily stores a fixed amount of data of the bird's-eye view image generated by the image generation unit 21. The fixed amount of data includes the image to be displayed as a portion thereof. Through the addition of this feature, when the user wishes to designate a parking location in an area outside the screen display, a parking location in an area that is outside the display on the initial screen can be designated by sliding the screen display location. The specific processing of the automatic parking apparatus according to the third embodiment is now described in detail with reference to FIG. 11 to FIGS. 14A and 14B.

FIG. 11 is a flowchart for illustrating an example of a series of operations of the automatic parking apparatus according to the third embodiment of the present invention. Operations of the respective components illustrated in FIG. 10 are now described with reference to the flowchart of FIG. 11.

The processing of Step ST301 and Step ST302 is the same as the processing of Step ST201 and Step ST202 of the second embodiment. In the third embodiment, the bird's-eye view image generated by the image generation unit 21 is stored in the image storage unit 24 as a fixed amount of image data including the image to be displayed as a portion thereof (Step ST303). The stored bird's-eye view image is used in the display processing (Step ST310) of an off-screen area, which is described later.

After that, the processing from Step ST304 to Step ST308 is the same as the processing from Step ST203 to Step ST207 of the second embodiment. The processing from after reception of the input of the parking location from the user until input completion, which is a feature of the third embodiment, is now described.

During the operation of inputting the parking location by the user, when the user wishes to park in a location outside the screen display, the image generation unit 21 receives an operation on the display of an off-screen area designated by the user (Step ST309). The operation method performed at this stage is described with reference to FIG. 12A to FIG. 12C, FIG. 13A, and FIG. 13B.

FIG. 12A to FIG. 12C are diagrams for illustrating an example of an operation for displaying an off-screen target parking area in the third embodiment of the present invention. For example, as illustrated in FIG. 12A, when the user touches a dedicated off-screen display button displayed at the upper right of the touch panel, the image generation unit 21 switches to an off-screen display mode as illustrated in FIG. 12B.

In the off-screen display mode, when the user touches or slides a screen edge of the location that the user wishes to slide and display, as illustrated in FIG. 12C, the image generation unit 21 can display the off-screen location desired by the user.

FIG. 13A and FIG. 13B are diagrams for illustrating an example of another operation for displaying the off-screen target parking area in the third embodiment of the present invention. In the off-screen display mode illustrated in FIG. 13A, as illustrated in FIG. 13B, the image generation unit 21 can also display the off-screen location desired by the user when the user maintains for a fixed period of time or more a state of touching the screen edge of the location that the user wishes to slide and display, and then performs a sliding operation.

During this operation, a bird's-eye view image of the off-screen area displayed on the touch panel is required. Therefore, in the third embodiment, a bird's-eye view image of the off-screen area displayed on the touch panel can be slidably displayed by reading the bird's-eye view image data stored in the image storage unit 24 (Step ST310).

After the desired off-screen area has been displayed in this manner, the user designates the parking location based on the above-mentioned plurality of operation styles.

With the features of the third embodiment, the following methods of designating the parking location are also possible. FIG. 14A and FIG. 14B are diagrams for illustrating an example of the operation of setting the off-screen target parking area in the third embodiment of the present invention. As illustrated in FIG. 14A and FIG. 14B, when the user touches a desired position on the screen and performs a sliding operation, the image generation unit 21 rotates and slidably moves the portion of the view other than the own vehicle, and displays the bird's-eye view image on the touch panel.

The rotation operation may be achieved by, for example, an operation that uses two fingers. In this manner, the image generation unit 21 of the third embodiment moves and rotates the view side of the bird's-eye view image in accordance with the user operation, and displays the bird's-eye view image at the location in which the user wishes to finally park the own vehicle.

With the above-mentioned operations and processing, a desired designation operation can be performed even when the user wishes to designate an off-screen area for the parking location. The processing of Step ST311 and the subsequent steps is the same as the processing of Step ST208 and the subsequent steps of the second embodiment.

In this way, the automatic parking apparatus according to the third embodiment includes the following feature in addition to the features of the second embodiment.

Feature of enabling a location outside the area of the initially-displayed bird's-eye view image to be designated as the parking location based on a touch input operation by the user.

Through the further inclusion of this feature, regardless of whether or not a white line or other such mark is provided to the parking space, the user can easily recognize and set an area in which the user wishes to park that is outside the area of the initially-displayed birds-eye view image, and the vehicle can be easily and automatically guided and controlled to the desired parking area.

The present invention is not limited to the respective first to third embodiments described above, and includes every possible combination of those.

What is claimed is:

1. An automatic parking apparatus, comprising:
a camera configured to photograph surroundings of an own vehicle;
a touch screen to receive a first touch input for designating a desired parking area; and
one or more processors configured to:
generate an image of the surroundings of the own vehicle based on image data obtained via the camera,
display the image on the touch screen, based on the first touch input specify a parking area where the own vehicle is to be moved, and determine whether a parking space for the own vehicle is available in the desired parking area,
based on the determining that the parking space for the own vehicle is available in the desired park in area, determine a plurality of moving path candidates for guiding the own vehicle from a current location of the own vehicle to the parking area, wherein the own vehicle is positioned with respect to the parking area such that the own vehicle is drivable to fit in the parking area according to different combinations of driving paths, and each of the plurality of moving path candidates represents one of the different combinations of driving paths,
display a boundary of the parking area, graphical representations of each of the plurality of moving path candidates, respectively, and user interfaces in association with the graphical representations, respectively on the touch screen,
select a moving path among the plurality of moving path candidates based on a second touch input received through one of the user interfaces displayed in association with one of the graphical representations, and
guide and control the own vehicle from the current location to the parking area in accordance with the selected moving path.

2. The automatic parking apparatus according to claim 1, wherein, based on the desired parking area being designated by a single line drawn on the touch screen as the first touch input, the one or more processors are further configured to specify the parking area by aligning the single line with a center axis of the own vehicle and matching an end point of the single line with a front end of the own vehicle.

3. The automatic parking apparatus according to claim 1, wherein the first touch input is a dragging input of touching and sliding a parked vehicle in the image, and
based on the parking area being designated by the dragging input, the one or more processors are further configured to specify the parking area as an area parallel to the parked vehicle.

4. The automatic parking apparatus according to claim 1, wherein the desired parking area is designated by a one point touch input of touching one point in an adjacent space, which is adjacent to a parked vehicle in the image, and
the one or more processors are further configured to specify the parking area as the adjacent space parallel to the parked vehicle.

5. The automatic parking apparatus according to claim 1, wherein the first touch input is a sliding type-input of moving and rotating a background portion of the image that is a portion of the image different from a portion of the image where the own vehicle is displayed, and
based on the desired parking area being designated by the sliding input, the one or more processors are further configured to rotate the background portion of the image based on the sliding input, and based on an operation of the sliding input being completed, specify the parking area based on a relative relationship between a location of the background portion and a location of the portion of the image where the own vehicle is displayed.

6. The automatic parking apparatus according to claim 1, wherein the touch screen is configured to receive a third touch input for displaying an outside location that is outside an area captured in the image,
wherein the one or more processors are further configured to:
control the camera to capture a second image including the outside location,
display the second image on the touch screen, and
receive the first touch input for designating the desired parking area through the second image.

7. The automatic parking apparatus according to claim 1, wherein the one or more processors are further configured to automatically adjust a location of the parking area based on environment information on the surroundings including at least one of a parked vehicle or a parking frame.

8. The automatic parking apparatus according to claim 7, wherein, based on the parked vehicle being present, the one or more processors are further configured to automatically adjust a direction of the own vehicle so that the adjusted direction matches a direction of the parked vehicle.

\* \* \* \* \*